(12) United States Patent
Duma (10) Patent No.: US 12,529,034 B2
(45) Date of Patent: Jan. 20, 2026

(54) WNT-ACTIVATED ADIPOSE-DERIVED STEM CELL APPARATUSES, METHODS AND SYSTEMS

(71) Applicant: Regeneration Biomedical, Inc., Newport Beach, CA (US)

(72) Inventor: Christopher Duma, Newport Beach, CA (US)

(73) Assignee: Regeneration Biomedical, Inc., Newport Beach, CA (US)

( * ) Notice: Subject to any disclaimer, the term of this patent is extended or adjusted under 35 U.S.C. 154(b) by 971 days.

(21) Appl. No.: 16/576,601

(22) Filed: Sep. 19, 2019

(65) Prior Publication Data

US 2020/0087626 A1    Mar. 19, 2020

Related U.S. Application Data

(60) Provisional application No. 62/733,427, filed on Sep. 19, 2018.

(51) Int. Cl.
*C12N 5/0775* (2010.01)
*A61P 19/02* (2006.01)

(52) U.S. Cl.
CPC .......... *C12N 5/0665* (2013.01); *A61P 19/02* (2018.01); *C12N 2501/115* (2013.01); *C12N 2501/16* (2013.01)

(58) Field of Classification Search
CPC ............... C12N 5/0665; C12N 5/0667; C12N 2501/415
See application file for complete search history.

(56) References Cited

U.S. PATENT DOCUMENTS

| | | |
|---|---|---|
| 5,222,982 A | 6/1993 | Ommaya |
| 5,385,582 A | 1/1995 | Ommaya |
| 5,720,720 A | 2/1998 | Laske et al. |
| 5,753,505 A | 5/1998 | Luskin |
| 7,442,372 B2 | 10/2008 | Kakkis |
| 7,582,292 B2 | 9/2009 | Wilkison et al. |
| 7,670,838 B2 | 3/2010 | Deisseroth et al. |
| 8,282,593 B2 | 10/2012 | Dacey, Jr. et al. |
| 2003/0092176 A1 | 5/2003 | Janson et al. |
| 2010/0119496 A1 | 5/2010 | Wilkison et al. |
| 2010/0286585 A1 | 11/2010 | DiMauro et al. |
| 2012/0100114 A1 | 4/2012 | Gregory et al. |
| 2014/0127171 A1 | 5/2014 | Nocera et al. |
| 2019/0224245 A1 | 7/2019 | Katz et al. |
| 2022/0288128 A1 | 9/2022 | Kumar |

FOREIGN PATENT DOCUMENTS

| | | | |
|---|---|---|---|
| CN | 107148275 A | 9/2017 | |
| WO | WO-2011050476 A1 * | 5/2011 | ............. A61K 35/30 |
| WO | 2016009446 A2 | 1/2016 | |

OTHER PUBLICATIONS

Roh et al. Nutrient-sensing in mTOR-mediated pathway regulates leptin production in isolated rat adipocytes. American Journal of Physiology Endocrinology and Metabolism 2003, 284:E322-E330. (Year: 2003).*
Rajashekar et al. IFATS collection: Adipose stromal cell differentiation is reduced by endothelial cell contact and paracrine communication: Role of canonical Wnt signaling. Stem Cells 2008, 26:2674-2681. (Year: 2008).*
Chandra et al. Generation of pancreatic hormone-expressing islet-like cell aggregates from murine adipose tissue-derived stem cells. Stem Cells 2009, 27;8:1941-1953. (Year: 2009).*
Chen et al. Chemically defined conditions for human iPS cell derivation and culture. Nature Methods 2011, 8;5:424-429. (Year: 2011).*
Huh et al. Arginine enhances osteoblastogenesis and inhibits adipogenesis through the regulation of Wnt and NFATc signaling in human mesenchymal stem cells. International Journal of Molecular Science 2014, 15;7:13010-12029. (Year: 2014).*
Zhong et al. Lgr5 positive stem cells sorted from small intestines of diabetic mice differentiate into higher proportion of absorptive cells and Paneth cells in vitro. Development, Growth & Differentiation 2015, 57:453-465. (Year: 2015).*
Shin et al. Hypoxia-activated adipose mesenchymal stem cells prevents irradiation-induced salivary hypofunction by enhanced paracrine effect through fibroblast growth factor 10. Stem Cells 2018; 36:1020-1032. (Year: 2018).*
Shin et al. Hypoxia-activated adipose mesenchymal stem cells prevents irradiation-induced salivary hypofunction by enhanced paracrine effect through fibroblast growth factor 10. Stem Cells 2018 Supplement; 36:1-44. (Year: 2018).*
Huang et al. Activation of Wnt/B-catenin signalling via GSK3 inhibitors direct differentiation of human adipose stem cells into functional hepatocytes. Scientific Reports 2017, 7:40716. (Year: 2017).*
Kemper et al. Monoclonal antibodies against Lgr5 identify human colorectal cancer stem cells. Stem Cells 2012, 30:2378-2386. (Year: 2012).*

(Continued)

*Primary Examiner* — Christopher M Babic
*Assistant Examiner* — Jennifer S Spence
(74) *Attorney, Agent, or Firm* — Irell and Manella LLP (57) ABSTRACT

The WNT-ACTIVATED ADIPOSE-DERIVED STEM CELL APPARATUSES, METHODS AND SYSTEMS (hereinafter "WAADSC") disclosed herein in various embodiments provide for production of an isolated and enriched population of mesenchymal stem cells that have an active Wnt signaling demonstrated by the elevated expression of Lgr5 marker and/or Nestin in more than 50% of the population. Such an autologous cell population may, in embodiments, be injected into cerebral ventricles of patients with neurodegenerative diseases to yield therapeutic results, such as halting the progression of certain conditions and/or ameliorating specific symptoms thereof.

20 Claims, 7 Drawing Sheets
(1 of 7 Drawing Sheet(s) Filed in Color)

(56) References Cited

OTHER PUBLICATIONS

Wiese et al. Nestin expression—a property of multi-lineage progenitor cells? Cellular and Molecular Life Sciences 2004, 61:2510-2522. (Year: 2004).*
McCrea et al. Beyond β-catenin: prospects for a larger catenin network in the nucleus. Nature Reviews Molecular Cell Biology 2016, 17:55-64. (Year: 2016).*
Ha et al. The safety and efficacy of a human perirenal adipose tissue-derived stromal vascular fraction in an interstitial cystitis rat model. Tissue Engineering and Regenerative Medicine 2023, 20;2:225-237. (Year: 2023).*
Tsuji et al. Adipose-derived stem cells: implications in tissue regeneration. World Journal of Stem Cells 2014, 6;3:312-321. (Year: 2014).*
Du et al. Comparison of administration routes for adipose-derived stem cells in the treatment of middle cerebral artery occlusion in rats. Acta Histochemica 2014, 116;6:1075-1084. (Year: 2014).*
Chakar, Diana, "Hepatic potential of Reversed-age Mesenchymal Stem Cells and Endodermal Progenitors: Contribution of LGR5 and Cdc42 cell signaling pathways", Ph.D. dissertation, HAL archives-ouvertes, submitted Aug. 31, 2018, pp. 1-215, Universite Paris-Saclay, Universite libanaise, http://tel.archives-ouvertes.fr/tel-01865143.
PCT Search Report and Written Opinion issued in PCT/US19/52008 on Jan. 16, 2020.
Salehi, Hossein et al., "An Overview of Neutral Differentiation Potential of Human Adipose Derived Stem Cells", Stem Cell Rev and Rep (2016), 12:26-41, Published Online Oct. 21, 2015, Springer Science+Business Media, New York, 2015.
Supplementary European Search Report, EP Application No. 19863703.5, dated May 11, 2022.
Tang, Dongmei et al., "Wnt/β-catenin interacts with the FGF pathway to promote proliferation and regenerative cell proliferation in the zebrafish lateral line neuromast", Experimental & Molecular Medicine (2019), vol. 51, 1-16, Official journal of the Korean Society for Biochemistry and Molecular Biology, Published online May 23, 2019, available at https://www.nature.com/articles/s12276-019-0247-x.
Wang, Degeng, "Discrepancy between mRNA and protein abundance: Insight from information retrieval process in computers", NIH Public Access, Author Manuscript, Comput Biol Chem. Dec. 2008 ; 32(6): 462-468, available at https://www.ncbi.nim.nih.gov/pmc/articles/PMC2637108/.
Kendrick, Nancy et al., "A gene's mRNA level does not usually predict its protein level", Kendrick Labs, Inc., Sep. 25, 2014, available at https://kendricklabs.com/wp-content/uploads/2016/08/WP1_mRNAvsProtein_KendrickLabs.pdf.
International Search Report and The Written Opinion of the International Search Authority; PCT/US19/19294; May 15, 2019; entire document.
Baek, W., et al., "Stem cell transplantation into the intraventricular space via an Ommaya reservoir in a patient with amyotrophic lateral sclerosis", J Neurosurg Sci., 2012, vol. 56, issue 3, pp. 261-263.
Duma, Christopher, et al., "Human intracerebroventricular (ICV) injection of autologous, non-engineered, adipose-derived stromal vascular fraction (ADSVF) for neurodegenerative disorders: results of a 3-year phase 1 study of 113 injections in 31 patients", Molecular Biology Reports, 2019, 46:5257-5272.
Mastrolia et al., "Challenges in Clinical Development of Mesenchymal Stromal/Stem Cells: Concise Review," Stem Cells Translational Medicine, 2019, 8:1135-1148 (available at https://pmc.ncbi.nlm.nih.gov/articles/PMC6811694/).
Mesenchymal Stromal Cell Survey Results, Population Heterogeneity, Serum Issues, Nomenclature, and More, Stemcell Technologies (available at https://www.stemcell.com/mesenchymal-stromal-cell-survey-results).
Jossen et al., "Mass Production of Mesenchymal Stem Cells—Impact of Bioreactor Design and Flow Conditions on Proliferation and Differentiation," Chapter 5, Cells and Biomaterials in Regenerative Medicine, 2014, 119-174 (available at https://www.intechopen.com/chapters/47782).
Yeatts et al., Bioreactors to Influence Stem Cell Fate: Augmentation of Mesenchymal Stem Cell Signaling Pathways via Dynamic Culture Systems, Biochim Biophys Acta. 2012, 1830(2):2470-2480 (available at https://pmc.ncbi.nlm.nih.gov/articles/PMC3461086/).
Yi et al, "Functional variation among mesenchymal stem cells derived from different tissue sources," 2024, PeerJ 12: e17616 DOI 10.7717/peerj.17616 (available at https://pubmed.ncbi.nlm.nih.gov/38952966/).
Kuterbekov, et al., "Design of experiments to assess the effect of culture parameters on the osteogenic differentiation of human adipose stromal cells," Stem Cell Research & Therapy, (2019) 10:256 (available at https://pubmed.ncbi.nlm.nih.gov/31412950/).
Lotfimehr et al., "mTOR signalling pathway in stem cell bioactivities and angiogenesis potential," 2023;56:e13499, Cell Prolif., Wiley, (available at https://pmc.ncbi.nlm.nih.gov/articles/PMC1069-3190/).
"Tissue Dissociation Guide: Collagenase, Dispase, and Liberase Enzyme Types" (available at https://www.sigmaaldrich.com/US/en/technical-documents/technical-article/research-and-disease-areas/cell-signaling/collagenase-guide) (accessed Sep. 24, 2025).

* cited by examiner

WNT-ACTIVATED ADIPOSE-DERIVED STEM CELL APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

This application is a non-provisional of, and claims priority under 35 U.S.C. § 119(e) to, prior U.S. provisional patent application Ser. No. 62/733,427 filed Sep. 19, 2018, entitled, "WNT-Activated Adipose-Derived Stem Cell Apparatuses, Methods and Systems". The entire contents of the aforementioned application are hereby expressly incorporated herein by reference.

FIELD

The present innovations generally address autologous therapies using adipose-derived stem cells, and more particularly, include WNT-ACTIVATED ADIPOSE-DERIVED STEM CELL APPARATUSES, METHODS AND SYSTEMS.

BACKGROUND

Disorders of the central nervous system include a wide variety of pathologies and afflictions, including brain damage associated with head injuries or stroke, injuries of the spinal cord, neurodegenerative diseases such as Alzheimer's and Parkinson's, and various other nervous system diseases and dysfunctions. Such disorders can be extremely debilitating, and the pursuit of treatments and curative therapies has presented major challenges for doctors and scientists alike. Recently, stem cell therapies have become available and shown some promise in the treatment of various ailments, including nervous system repairs.

SUMMARY

The WNT-ACTIVATED ADIPOSE-DERIVED STEM CELL APPARATUSES, METHODS AND SYSTEMS (hereinafter "WAADSC") disclosed herein in various embodiments provide for production of an isolated and enriched population of mesenchymal stem cells that have an active Wnt signaling demonstrated by the elevated expression of Lgr5 marker and/or Nestin in more than 50% of the population. Such an autologous cell population may, in embodiments, be injected into cerebral ventricles of patients with neurodegenerative diseases to yield therapeutic results, such as halting the progression of certain conditions and/or ameliorating specific symptoms thereof. In other embodiments, such autologous cell populations may be administered in other ways, including but not limited to intravenous injection, intraarterial injection, intraarticular injection, and/or the like.

In one embodiment, a composition of Wnt-activated mesenchymal stem cells, derived from adipose tissue, is disclosed, such as wherein at least 50% of mesenchymal stem cells express Lgr5 and nestin.

In one embodiment, a method for producing a composition of Wnt-activated mesenchymal stem cells, derived from adipose tissue is disclosed, comprising: exposing mesenchymal stem cells to Activin A, basic Fibroblast Growth Factor (bFGF) and a combination of signaling amino acids consisting in elevated concentration of Leucine, Arginine and Taurine besides all essential and nonessential amino acids.

In one embodiment, a therapeutic method is disclosed, comprising: applying Wnt-activated mesenchymal stem cells for treatment of degenerative central nervous system pathologies. Alternative embodiments may include application of Wnt-activated mesenchymal stem cells for treatment of any of a variety of other conditions, such as but not limited to chronic obstructive pulmonary disease, arthritis, diabetes, and/or the like.

BRIEF DESCRIPTION OF THE DRAWINGS

The accompanying appendices and/or drawings illustrate various non-limiting, example, innovative aspects in accordance with the present descriptions.

The patent or application file contains at least one drawing executed in color. Copies of this patent or patent application publication with color drawing(s) will be provided by the Office upon request and payment of the necessary fee.

DETAILED DESCRIPTION

Some approaches for autologous therapies using adipose derived stem cells are based on a mixture of cells of various morphologies containing, e.g., approximately 7-8% adipose mesenchymal stem cells, 7-8% blood progenitors and the rest of about 85% a mixture of fibroblasts, myocytes, vascular endothelial cells and blood cells. The process may employ a bedside manipulation by a differential centrifugation.

Certain methods to expand a particular stem cell fraction from this mixture are based on a cultivation in plastic containers with cell culture media containing animal serum and optional growth factors. Such methods may employ extended time of in-vitro manipulations that is subjecting the cells to various risk of contaminations and genome instability. Such methods may also bias towards an osteogenic/chondrogenic population of MSCs. Other methods use serum free commercial media such as Mesencult™ and similar that may result in a mostly osteogenic/chondrogenic/adipogenic CD44/CD105 positive population.

In some embodiments, mesenchymal stem cell production may facilitate a rapid expansion based on the combination of Activin A and a combination of signaling amino-acids that stimulates the mTOR pathway. Such methods may provide isolation and expansion of an enriched population of mesenchymal stem cells that has an active Wnt signaling demonstrated by the elevated expression of Lgr5 marker in more than 50% (e.g., up to 99%, or more) of population. In addition, more than 50% of the cells in the expanded population express Nestin.

In some embodiments, a Wnt-activated autologous cell population so obtained may then be injected into cerebral ventricles of patients, e.g., with neurodegenerative diseases such as Alzheimer's, Parkinson's, or various other nervous system diseases and dysfunctions. In other embodiments, such autologous cell populations may be administered in other ways, including but not limited to intravenous injection, intraarterial injection, intraarticular injection, and/or the like. For example, arthritis treatments employing such cell populations may be effected by injection of the cells into affected joints. Treatment may ameliorate the specific symptoms of these diseases through various possible mechanisms including (a) differentiation of mesenchymal stem cells in neural types and integration in the brain; (b) trophic paracrine effect and stimulation of neurogenesis; and/or (c) anti-inflammatory paracrine effect. Increase of hippocampal volume in at least one of the subjects was observed. Embodiments employing bedside manipulation by differential centrifugation may increase the safety and efficiency of treatment. Alternative embodiments may include application of Wnt-activated mesenchymal stem cells for treatment of any of a variety of other conditions, such as but not limited to chronic obstructive pulmonary disease (COPD), heart disease, arthritis, diabetes, and/or the like.

In some embodiments, mechanisms of action may comprise the neuronal trophic support and plasticity by secretome and autocrine activity of transplanted Lgr5-positive mesenchymal stem cells.

Figure 1:
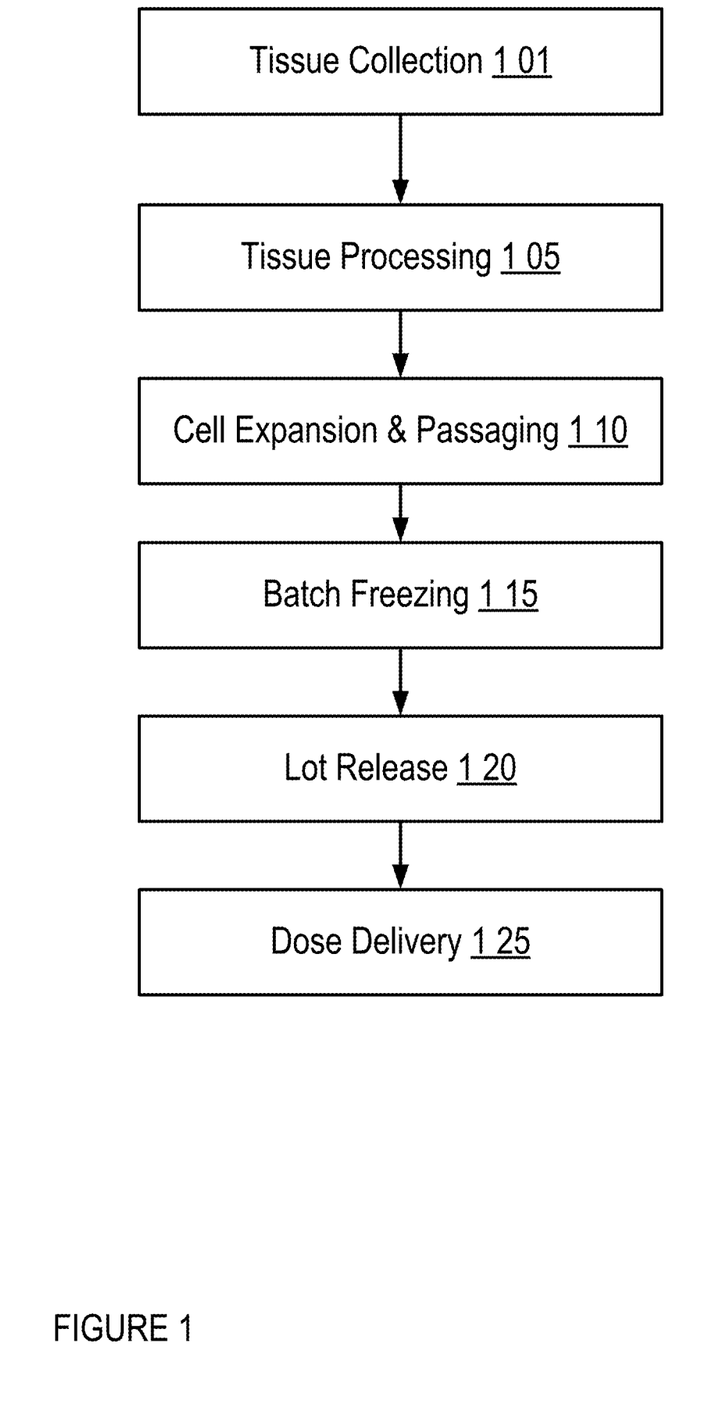
FIG. 1 shows an example of logic flow for a global process to collect, process, prepare and dose Wnt-activated adipose derived stem cells in one embodiment of WAADSC.

FIG. 1 shows an example of logic flow for a global process to collect, process, prepare and dose Wnt-activated adipose derived stem cells in one embodiment of WAADSC. Tissue may be collected 101 by employing a collection kit consisting of a container (e.g., CredoCube) with a particular temperature and/or media content for the tissue to be distributed within. Collected tissue may then be processed 105 in preparation for cell expansion and passaging 110. Once a sufficient cell count is achieved, batch freezing is performed 115. Prior to use, a lot release process 120 may be undertaken, such as employing quality control (QC) vials to perform testing. Doses with adequate quality in the lot release process may then be delivered 125.

Figure 2:
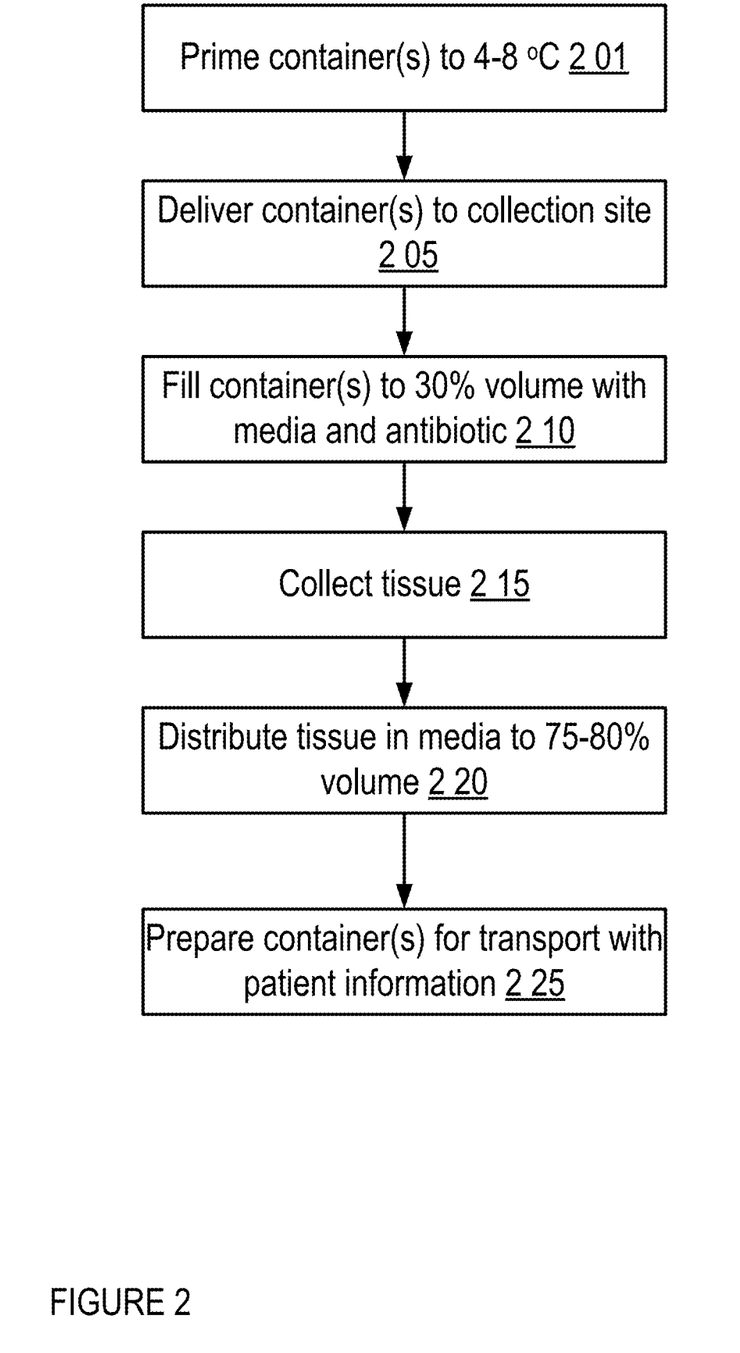
FIG. 2 shows an example of logic flow for tissue collection in one embodiment of WAADSC.

FIG. 2 shows an example of logic flow for tissue collection in one embodiment of WAADSC. A collection kit consisting of a container (e.g., CredoCube) may be primed to a particular temperature (e.g., 4-8° C.) 201 and delivered to a collection site in advance of tissue collection, such as one day prior to the collection procedure 205. For example, in one implementation, the kit may include 4-6 containers having volumes of 50 to 100 mL each. The containers are filled to a fraction of their total volume, such as 30%, with media with antibiotic 210. In one implementation, the media may be ABstem basal media with ABStem media supplement. In another implementation, the media may be a commercial basal media (e.g., DMEM, DMEM-F12, RPMI, Williams, AB Stem) supplemented with a composition containing, e.g., Insulin, Sodium Selenite and Vitronectin at physiological concentrations and supraphysiological concentrations of L-Leucine (e.g., 0.12 to 1.2 g/L), L-Arginine (e.g., 0.35 to 2 g/L) and Taurine (e.g., 1.0 to 2.5 g/L). In one implementation, the antibiotic may be Penicillin and Streptomycin cell culture grade, used at a concentration of 1× (e.g., ThermoFisher catalog #10378016). Tissue (e.g., adipose tissue) may then be collected 215, and the tissue may be distributed in the media containers to a fraction of their total volume, such as 75-80% 220. In one implementation, adipose tissue may be collected from a liposuction procedure. The containers may then be placed in the collection it along with corresponding patient documentation, labeling, and/or the like and prepared for transport 225.

Figure 3:
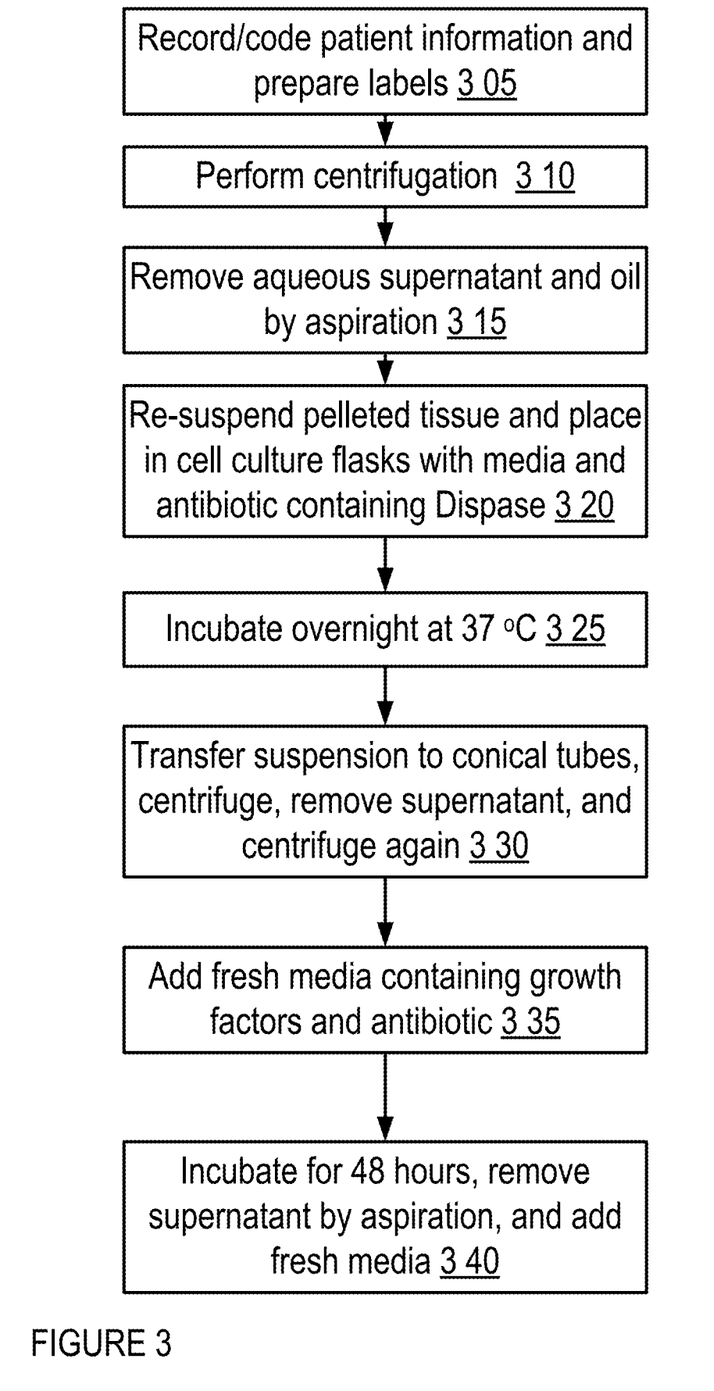
FIG. 3 shows an example of logic flow for tissue processing in one embodiment of WAADSC.

FIG. 3 shows an example of logic flow for tissue processing in one embodiment of WAADSC. Upon arrival of the collection kit at a manufacturing facility, the patent information may be recorded, coded, and used to generate labels that are employed in subsequent processes 305. The collected tissue may then be extracted from the transport media, such as by centrifugation 310. In one implementation, centrifugation may be performed for about 5 minutes at about 250 G. Following centrifugation, the top layer consisting of oil (e.g., a yellow oily substance) may be removed, such as by aspiration, along with the aqueous supernatant 315. The pelleted tissue may then be re-suspended and placed in cell culture flasks (e.g., 1-5 grams per flask) with media with antibiotic and Dispase 320. In one implementation, about 25-30 mL of media (e.g., ABstem basal media with ABstem media supplement) with antibiotic (e.g., Penicillin and Streptomycin cell culture grade at a concentration of 1×) may be employed, together with 1 UI/mL Dispase or 2 mg/mL Collagenase IV. In one implementation, about 0.3-0.5 mL/cm2 of culture surface of basal media (e.g., DMEM-F12, RPMI, Williams, ABstem) supplemented with a composition containing Insulin (e.g., 0.05-0.2 g/L), Sodium Selenite (e.g., 0.001-0.010 ng/L), Vitronectin (e.g., 25-100 ng/L), L-Leucine (e.g., 0.12 to 1.2 g/L), L-Arginine (e.g., 0.35 to 2 g/L) and Taurine (e.g., 1.0 to 2.5 g/L), with an antibiotic (e.g., Penicillin and Streptomycin cell culture grade at a concentration of 1×) may be employed, together with 1 UI/mL Dispase or 2 mg/mL Collagenase IV. In one implementation, the Dispase or Collagenase may comprise powder prepared to the specified concentration (e.g., 1 UI/mL) in media and sterile filtered through, e.g., a 0.1 micron filter. The flasks may then be incubated 325, such as overnight at about 37° C. with Dispase, or for 30 minutes to 1 hour with Collagenase. The suspension may then be collected, transferred to conical tubes (e.g., 50 mL) and centrifuged (e.g., at 250 G), after which the supernatant may be removed and the centrifugation repeated again 330. Fresh media composition as above, excluding Dispase or Collagenase, may then be added (e.g., up to 0.5 mL/cm$^2$ of cell culture surface) along with growth factors and antibiotic 335. In one implementation, the growth factors may be added directly to fresh media from pre-made stock aliquots that are kept frozen (e.g., at less than −20° C. or at 4° C. for up to 1 week). In implementations, the growth factors may comprise Activin A at, e.g., about 5 ng/mL (e.g., stock solution is 5 μg/mL, and may be used at 1 μL per mL of media); and basic Fibroblast Growth Factor (bFGF) at, e.g., about 10 ng/mL (e.g., stock solution is 5 μg/mL, and may be used at 1 μL per mL of media). The cell suspension may then be transferred into incubators for incubation 340. In one implementation, incubation may occur for 48 hours and/or continuing a Monday-Wednesday-Friday schedule, after which the supernatant is removed, such as by aspiration, and fresh media added until full confluence of the adherent cells. In one implementation, the media may comprise basal media (e.g., DMEM-F12, RPMI, Williams, ABstem) supplemented with a composition containing Insulin (e.g., 0.05-0.2 g/L), Sodium Selenite (e.g., 0.001-0.010 ng/L), Vitronectin (e.g., 25-100 ng/L), L-Leucine (e.g., 0.12 to 1.2 g/L), L-Arginine (e.g., 0.35 to 2 g/L) and Taurine (e.g., 1.0 to 2.5 g/L) as well as growth factors (e.g., Activin A 5 ng/mL and bFGF 10 ng/mL), but with no antibiotic. In one implementation, the media may comprise ABStem basal media with ABStem media supplement as well as growth factors (e.g., Activin A and/or FGF), but with no antibiotic.

Figure 4:
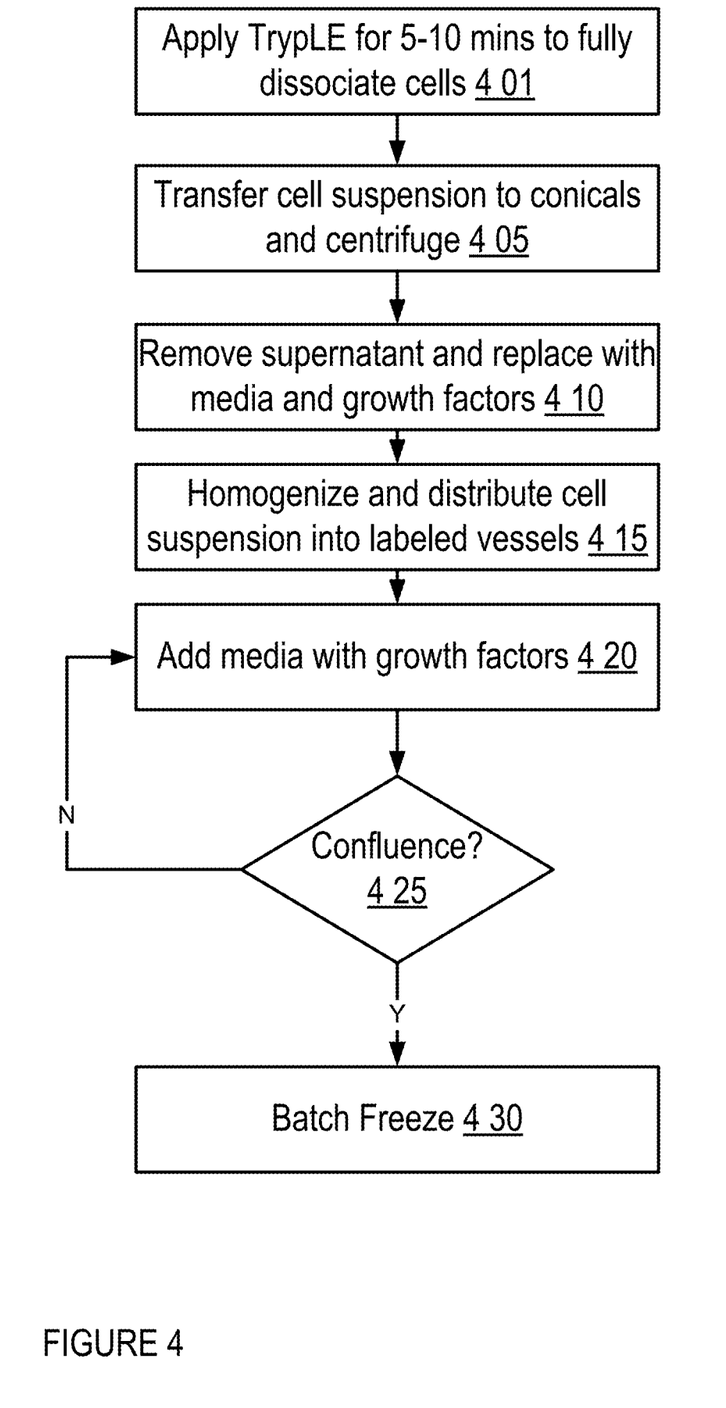
FIG. 4 shows an example of logic flow for cell expansion and passaging in one embodiment of WAADSC.

FIG. 4 shows an example of logic flow for cell expansion and passaging in one embodiment of WAADSC. In one implementation, about 1 week after reaching confluence, the cells may be enzymatically dissociated and transferred to larger vessels for passaging 401. In one implementation, TrypLE, and/or the like recombinant cell-dissociation enzymes, may be applied (e.g., for 5-10 minutes) to dissociate the cells. In one implementation, TrypLE (e.g., ThermoFisher Catalog #12604013) may be used undiluted, as is. The cell suspension may then be transferred to conical tubes (e.g., 50 mL) and centrifuged 405, such as at about 250 G. The supernatant may then be removed and replaced with fresh media (e.g., DMEM-F12, RPMI, Williams, ABstem) supplemented with a composition containing Insulin (e.g., 0.05-0.2 g/L), Sodium Selenite (e.g., 0.001-0.010 ng/L), Vitronectin (e.g., 25-100 ng/L), L-Leucine (e.g., 0.12 to 1.2 g/L), L-Arginine (e.g., 0.35 to 2 g/L) and Taurine (e.g., 1.0 to 2.5 g/L) and growth factors (e.g., Activin A, 5 ng/mL and bFGF, 10 ng/mL) 410. The cell suspension may then be homogenized and distributed (e.g., at 1:4, 1:6, and/or the like ratio) into new cell culture vessels labeled with the patient ID 415. Media with growth factors may be added (e.g., to 0.4 mL/cm$^2$ of culture vessel) 420. A determination may be made as to whether a desired degree of confluence has been achieved 425. If not, feeding of the culture may continue (e.g., on a Monday-Wednesday-Friday schedule) 420. Otherwise, once adequate confluence is achieved, the process can proceed to batch freezing 430.

Figure 5:
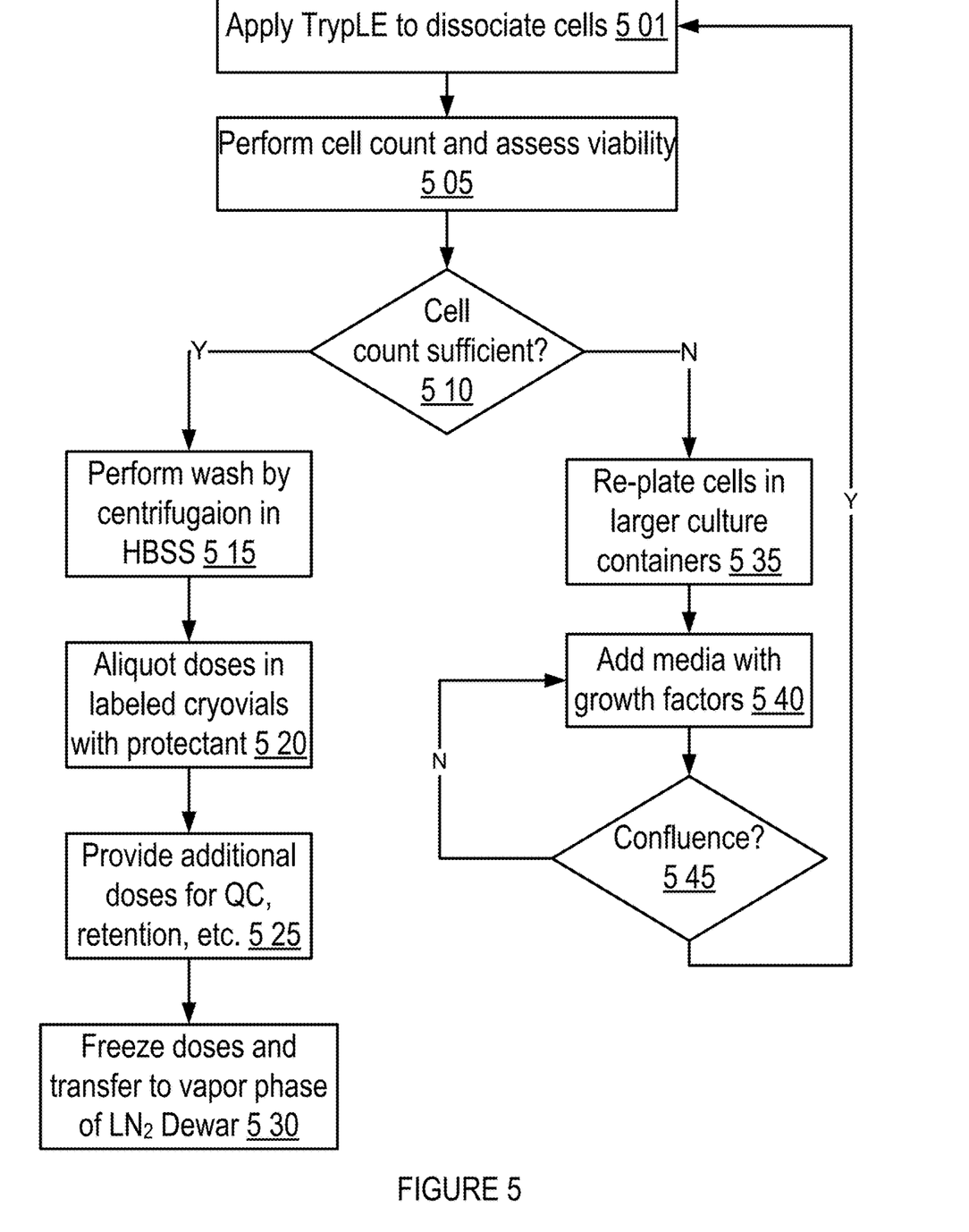
FIG. 5 shows an example of logic flow for batch freezing in one embodiment of WAADSC.

FIG. 5 shows an example of logic flow for batch freezing in one embodiment of WAADSC. Cultures may be dissociated, such as by using TrypLE 501. A cell count and assessment of viability may then be performed 505, and a determination made as to whether the cell count is sufficient 510. For example, in one implementation, sufficiency of the cell count may be based on the number of doses to be administered and/or the desired number of cells per dose. If the cell count is determined to be sufficient, an extra wash by centrifugation, e.g., in Hank's Balanced Salt Solution (HBSS), may be performed 515. Doses may then be aliquoted in patient ID-labeled cryovials 520. In one implementation, a protectant, such as Cryostor CS5 media (e.g., BioLife Solutions 10 mL Vial, Part #205373) used as per manufacturer instructions, may be included as well. A number (e.g., four) of additional smaller vials, e.g., with about 10$^6$ cells/vial, may be prepared from the main batch for quality control, retention, and/or the like 525. The lot of doses may then be transferred into a freezing environment, such as the vapor phase of a liquid nitrogen Dewar 530. When the cell count is insufficient at 510, all or part of the cells may be re-plated in larger cell culture containers 535. Media (e.g., DMEM-F12, RPMI, Williams, ABstem) supplemented with Insulin (e.g., 0.05-0.2 g/L), Sodium Selenite (e.g., 0.001-0.010 ng/L), Vitronectin (e.g., 25-100 ng/L), L-Leucine (e.g., 0.12 to 1.2 g/L), L-Arginine (e.g., 0.35 to 2 g/L) and Taurine (e.g., 1.0 to 2.5 g/L) and growth factors (e.g., Activin A 5 ng/mL and bFGF 10 ng/mL) may then be added 540 to effect expansion until a sufficient degree of confluence has been achieved 545.

In some embodiments, dose delivery may be preceded by one or more QC testing and/or lot release procedures. For example, QC vials may be employed to perform testing to assist with a determination of dose quality. In one implementation, QC standards for lot release may include one or more of the following: viability >75% (e.g., as measured by trypan blue staining); sterility (e.g., as measured by USP 71 sterility testing); *Mycoplasma* negative test results (e.g., as measured via Sigma-Aldrich and/or VenorGem *Mycoplasma* detection kits); endotoxin content (e.g., as determined via USB 85 endotoxin testing); phenotype testing (e.g., to identify >50% Lgr5 positive cells); and/or the like.

Figure 6:
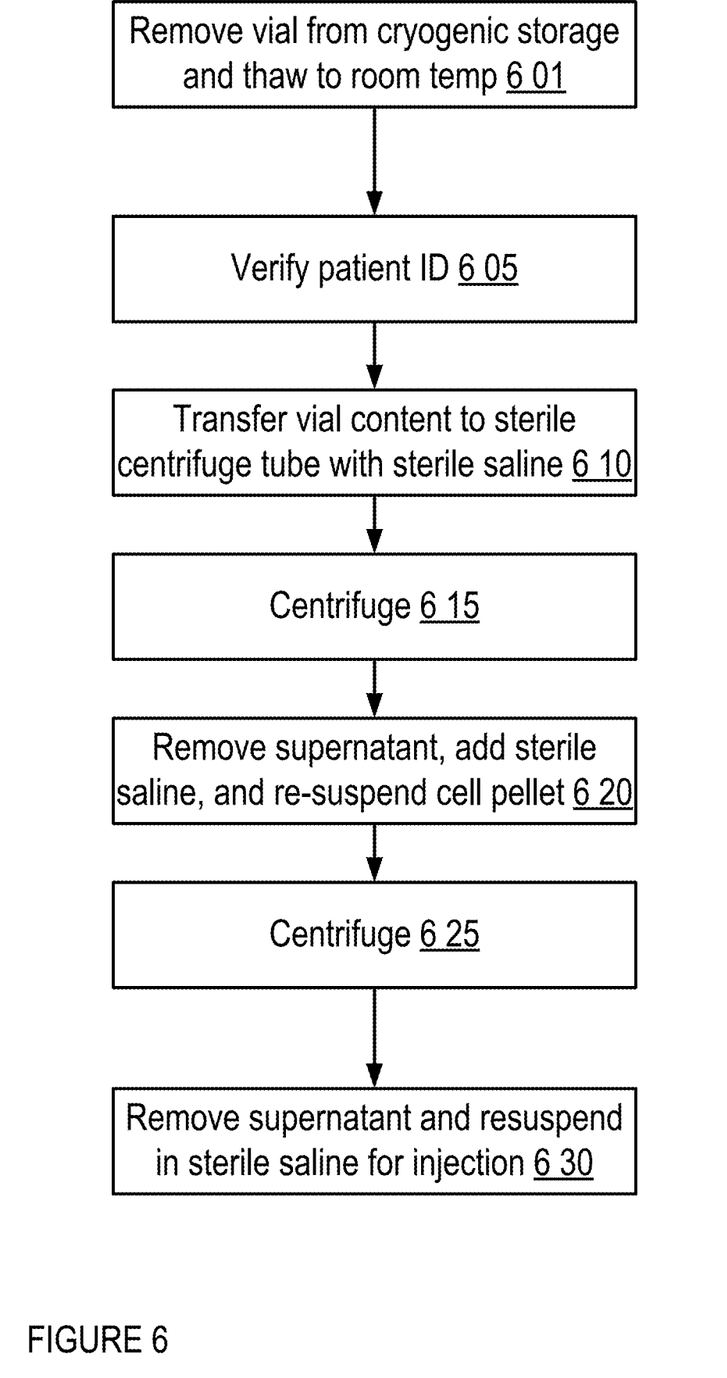
FIG. 6 shows an example of logic flow for dose delivery in one embodiment of WAADSC.

FIG. 6 shows an example of logic flow for dose delivery in one embodiment of WAADSC. A dose may be removed from the cryogenic storage and thawed at room temperature (e.g., for about 10 minutes) 601. Identifying information from the vial may be verified to match with the patient 605. Vial contents may then be transferred to a sterile centrifuge tube together with a quantity (e.g., 10 mL) of sterile saline 610. In one implementation, the sterile saline may be USP and/or medical grade sterile saline solution. Centrifugation may then be performed 615, e.g., for 5 minutes at 250 G. The supernatant may then be removed, more sterile saline added (e.g., 10 mL), and the cell pellet re-suspended 620, after which centrifugation is performed again 625, e.g., for 5 minutes at 250 G. The supernatant is removed again and the dose is re-suspended in the final sterile saline volume that will be injected into the patient (e.g., 5 mL) 630.

In some embodiments, the injected product comprises a mixture of cells of various morphologies containing, e.g., about 7-8% adipose mesenchymal stem cells, about 7-8% blood progenitors, and the rest (about 85%) a mixture of fibroblasts, myocytes, vascular endothelial cells and blood cells. In some embodiments, the product may be injected into cerebral ventricles of patients, e.g., as a therapeutic application for neurodegenerative diseases such as Alzheimer's, Parkinson's, or various other nervous system diseases and dysfunctions. When injected into ventricles of the brain, several therapeutic mechanisms of action may occur, such as differentiation of mesenchymal stem cells in neural types and integration in the brain, trophic paracrine effect and stimulation of neurogenesis, autocrine effect, anti-inflammatory paracrine effect, and/or the like. Autocrine effect, trophic paracrine effect, and/or anti-inflammatory paracrine effect may also occur in other therapeutic applications. For example, in some embodiments, the product may be injected into joints, ligaments, tendons, bursa, and/or the like, such as for treatment of arthritis, tendonitis, bursitis, and/or other joint disorders. In some embodiments, the product may be injected intravenously and/or intramuscularly, such as for treatment of heart disease, heart failure, and/or the like. In some embodiments, the product may be injected into organs of the endocrine system, digestive system, and/or the like, e.g., the pancreas, such as for treatment of diabetes and related disorders. In some embodiments, the product may be nebulized for inhalation and/or injected intravenously and/or into tissues of the respiratory system, such as for the treatment of COPD and/or other respiratory disorders.

Figure 7:
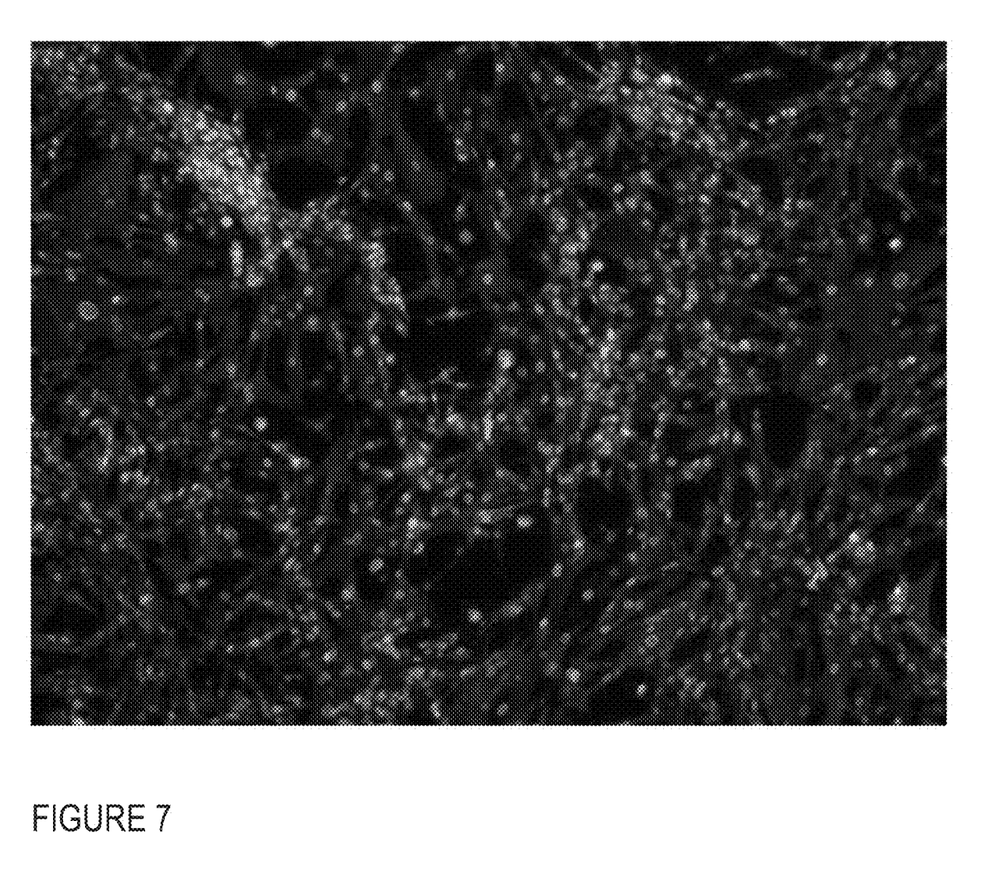
FIG. 7 shows an example of a WAADSC culture in one embodiment.

FIG. 7 shows an example of a WAADSC culture, with SOX9 expression (approximately 50%) and Lor5 expression (greater than 90%).

In order to address various issues and advance the art, the entirety of this application for WNT-ACTIVATED ADIPOSE-DERIVED STEM CELL APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any process steps and/or feature sets as described in the figures and/or throughout are not limited to a fixed operating order and/or arrangement, but rather, any disclosed order is exemplary and all equivalents, regardless of order, are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. A method for producing adipose-derived Wnt-activated mesenchymal stem cells, comprising:
    suspending adipose mesenchymal stem cells, blood progenitors, and a mixture of fibroblasts, myocytes, vascular endothelial cells, and blood cells in a culture flask with media with antibiotic and a dissociating enzyme to yield a first suspension;
    incubating the first suspension;
    centrifuging the first suspension;
    removing a first supernatant;
    adding the media, signaling amino acids, and growth factors to yield a second suspension,
    wherein the growth factors comprise at least one of Activin A and basic Fibroblast Growth Factor, and
    wherein the signaling amino acids comprise at least one of leucine and taurine but not arginine;
    incubating the second suspension;
    removing a second supernatant;
    adding the media and the growth factors to yield a third suspension;
    applying at least one recombinant cell-dissociation enzyme to the third suspension;
    centrifuging the third suspension;
    removing a third supernatant;
    adding the media and the growth factors to yield a fourth suspension;
    homogenizing the fourth suspension; and
    adding the media and the growth factors to yield confluent adipose-derived Wnt-activated mesenchymal stem cells,
    wherein more than 50% of the adipose-derived Wnt-activated mesenchymal stem cells exhibit elevated expression of Lgr5 and/or Nestin compared to isolated adipose-derived mesenchymal stem cells not subjected to the method for producing adipose-derived Wnt-activated mesenchymal stem cells.

2. The method of claim 1, wherein the adipose cells are derived from at least one liposuction procedure.

3. The method of claim 1, further comprising:
    batch freezing the confluent adipose-derived Wnt-activated mesenchymal stem cells to yield at least one frozen dose.

4. The method of claim 3, wherein the at least one frozen dose comprises at least one therapeutic dose and at least one quality control dose.

5. The method of claim 3, further comprising:
    thawing the at least one frozen dose to yield a thawed dose;
    adding sterile saline to the thawed dose to yield a fifth suspension;
    centrifuging the fifth suspension;
    removing a fifth supernatant;
    adding the sterile saline to yield a sixth suspension;
    centrifuging the sixth suspension;
    removing a sixth supernatant;
    adding an injectable volume of sterile saline to yield an injectable dose of adipose-derived Wnt-activated mesenchymal stem cells.

6. The method of claim 5, further comprising:
    injecting the injectable dose of adipose-derived Wnt-activated mesenchymal stem cells into at least one cerebral ventricle.

7. The method of claim 5, further comprising:
    injecting the injectable dose of adipose-derived Wnt-activated mesenchymal stem cells into pancreatic tissue.

8. The method of claim 5, further comprising:
    injecting the injectable dose of adipose-derived Wnt-activated mesenchymal stem cells into lung tissue.

9. The method of claim 5, further comprising:
    injecting the injectable dose of adipose-derived Wnt-activated mesenchymal stem cells into heart tissue.

10. The method of claim 5, further comprising:
    injecting the injectable dose of adipose-derived Wnt-activated mesenchymal stem cells into joint tissue.

11. The method of claim 5, further comprising:
    nebulizing the injectable dose of adipose-derived Wnt-activated mesenchymal stem cells to yield an inhalable dose of adipose-derived Wnt-activated mesenchymal stem cells.

12. The method of claim 3, wherein batch freezing further comprises:
    applying a second recombinant cell-dissociation enzyme;
    assessing cell count and viability; and
    when the cell count is greater than a minimum threshold:
        washing by centrifugation in HBSS;
        aliquoting washed doses in cryovials with protectant; and
        freezing the aliquoted washed doses in a vapor phase of liquid nitrogen to yield the at least one frozen dose.

13. The method of claim 1, wherein the media comprises a basal media and a media supplement.

14. The method of claim 13, wherein the basal media comprises one of DMEM-F12, RPMI, or Williams.

15. The method of claim 13, wherein the media supplement comprises a mixture of Insulin, Sodium Selenite, Vitronectin, L-Leucine, and Taurine.

16. The method of claim 1, wherein the antibiotic comprises Penicillin and Streptomycin cell culture.

17. The method of claim 1, wherein the dissociating enzyme comprises Dispase at a concentration of 1 UI/mL and Collagenase at a concentration of 2 mg/mL.

18. The method of claim 1, wherein the Activin A is prepared to a concentration of 5 ng/mL and the basic Fibroblast Growth Factor is prepared to a concentration of 10 ng/mL.

19. The method of claim 1, wherein centrifuging the first suspension, the second suspension, and the third suspension is performed at approximately 250 G.

20. The method of claim 1, wherein incubating the first suspension is performed overnight and incubating the second suspension is performed for 48 hours.

\* \* \* \* \*